United States Patent [19]
Zemp

[11] Patent Number: 4,671,344
[45] Date of Patent: Jun. 9, 1987

[54] METHOD FOR CLOSELY REGULATING THE TEMPERATURE OF A LABORATORY REACTION VESSEL ARRANGEMENT

[75] Inventor: Georg Zemp, Zurich, Switzerland

[73] Assignee: Contraves AG, Zurich, Switzerland

[21] Appl. No.: 883,369

[22] Filed: Jul. 8, 1986

Related U.S. Application Data

[62] Division of Ser. No. 769,453, Aug. 26, 1985.

[30] Foreign Application Priority Data

Sep. 7, 1984 [CH] Switzerland .................. 4278/84

[51] Int. Cl.⁴ .................. F25B 29/00; F28F 3/12; F28F 13/12
[52] U.S. Cl. .................. 165/2; 165/61; 165/169; 220/428
[58] Field of Search .................. 165/169, 2, 14, 61, 165/101; 126/377, 378, 379; 220/426, 428; 422/138, 202, 205

[56] References Cited

U.S. PATENT DOCUMENTS

| 1,777,969 | 10/1930 | Grill | 126/378 |
| 2,230,638 | 2/1941 | Brown | 165/169 |
| 4,552,724 | 11/1985 | Matsumoto et al. | 165/169 |

FOREIGN PATENT DOCUMENTS

| 568235 | 8/1933 | Fed. Rep. of Germany | 126/378 |
| 729386 | 1/1932 | France | 165/169 |
| 1371797 | 10/1974 | United Kingdom | 165/169 |
| 1582836 | 1/1981 | United Kingdom | 165/169 |
| 1603361 | 11/1981 | United Kingdom | 165/169 |

*Primary Examiner*—William R. Cline
*Assistant Examiner*—John K. Ford
*Attorney, Agent, or Firm*—Werner W. Kleeman

[57] ABSTRACT

A method is disclosed for closely regulating the temperature of a laboratory reaction vessel arrangement which permits a desired temperature change to be rapidly established. The method contemplates introducing a fluid heat transfer medium into a thermal chamber formed by a reactor vessel and a jacketing vessel of the laboratory reaction vessel arrangement in a finely turbulent and essentially helically ascending manner.

3 Claims, 3 Drawing Figures

FIG. 2
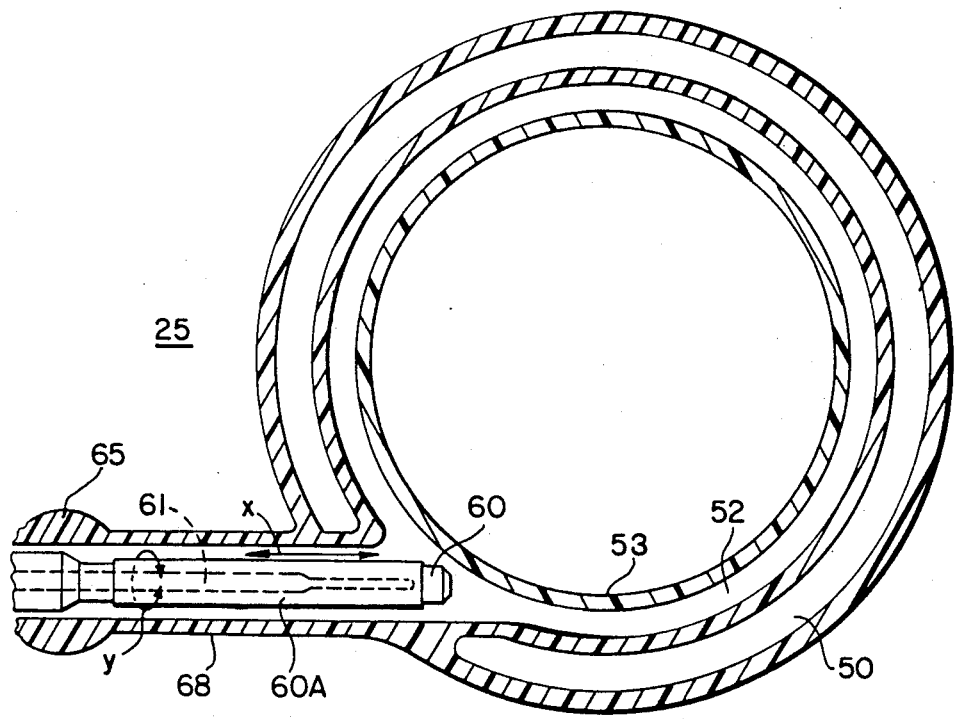
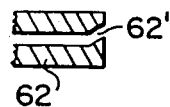
FIG. 2A

METHOD FOR CLOSELY REGULATING THE TEMPERATURE OF A LABORATORY REACTION VESSEL ARRANGEMENT

CROSS REFERENCE TO RELATED APPLICATION

This application is a divisional application of my copending U.S. patent application Ser. No. 06/769,453, filed Aug. 26, 1985 and entitled: "TEMPERATURE REGULATING DEVICE FOR A LABORATORY REACTION VESSEL ARRANGEMENT".

BACKGROUND OF THE INVENTION

The present invention broadly relates to chemical reaction technology and, more specifically, pertains to a new and improved method for tempering or regulating the temperature of a laboratory reaction vessel arrangement.

Generally speaking, the apparatus of the present invention used for the practice of the inventive method is of the type intended for a laboratory reaction vessel arrangement. The method of the present invention is for tempering or regulating the temperature of a laboratory reaction vessel arrangement having a thermal chamber through which a fluid tempering medium or fluid heat transfer medium for transporting thermal energy is conducted.

Laboratory reaction vessels or laboratory chemical reactors are vessels made of glass, plastic or metal in which chemical reactions are carried out under predetermined conditions. An important one of these conditions is the temperature. In process or reaction technology, temperature control or regulation plays a very great role. Multiple requirements are placed on static temperature conditions, dynamic temperature conditions, or both. For instance, it may be required to stabilize a temperature within very narrow tolerances or it may be required to precisely temporally vary temperature (heating or cooling).

The temporally dependent control of temperature can be generally classified according to three groups of requirements:

1. slow to very slow control of temperature in relation to time;
2. control of temperature at rates ranging between pronouncedly slow and pronouncedly rapid in relation to time; and
3. rapid to very rapid control of temperature in relation to time.

The second group of temperature control listed above is the least demanding and probably the most frequently occurring procedure, while the temperature control of the other two groups 1 and 3 must be designated as problems of process technology ranked as more demanding to nearly insoluble. The problem of gradual cooling is, for example, known from the fabrication of concave mirrors in which the formation of temperature gradients within the material being processed must be avoided or minimized as far as possible. The opposite case arises when energy is to be supplied to or withdrawn from a material to be processed, for instance a fluid medium, as rapidly as possible.

The present invention is concerned with the problem of rapid temperature changes or variations mentioned in the third group of problem areas.

SUMMARY OF THE INVENTION

Therefore, with the foregoing in mind, it is a primary object of the present invention to provide a new and improved method for tempering or regulating the temperature of a laboratory reaction vessel arrangement which does not exhibit the aforementioned drawbacks and shortcomings of the prior art techniques.

Another and more specific object of the present invention aims at providing a new and improved method for tempering or regulating the temperature of a laboratory reaction vessel arrangement which permits tempering or regulating the temperature of a reaction vessel rapidly and precisely with a high temperature rise and drop.

Now in order implement these and still further objects of the invention, which will become more readily apparent as the description proceeds, the apparatus of the present invention is manifested by the features that it comprises a thermal chamber for a fluid tempering medium or fluid heat transfer medium, which at least partially surrounds a reaction vessel of the laboratory reaction vessel arrangement, a jacketing vessel which at least partially surrounds the thermal chamber, at least one inlet aperture for the fluid tempering medium or fluid heat transfer medium arranged to extend through the jacketing vessel and into the thermal chamber. A nozzle is arranged in the region of the aperture, the nozzle having an outlet orifice, and the nozzle being arranged in said region of the aperture such that the fluid tempering medium or fluid heat transfer medium flows through the nozzle and out of the outlet orifice. The nozzle is also arranged such that the fluid tempering medium or fluid heat transfer medium flowing out of the outlet orifice subsequently flows into the thermal chamber.

The apparatus of the present invention may be further manifested by the features that it may comprise a source of thermal energy, a sink for thermal energy arranged in parallel with the source, a T-junction connected in series with the source and in series with the sink, a mixing device connected in series with the T-junction, a thermal chamber for a fluid tempering medium or fluid heat transfer medium which at least partially surrounds the reaction vessel, an inlet aperture for admitting the fluid tempering medium or fluid heat transfer medium into the thermal chamber, a nozzle situated in the inlet aperture, and the source, the sink, the T-junction and the mixing device being arranged before or ahead of i.e. upstream of the nozzle.

The method of the present invention is manifested by the features that it comprises the steps of introducing the fluid tempering medium or fluid heat transfer medium as an essentially finely turbulent flow into a thermal chamber of a jacketing vessel at least partially surrounding a reaction vessel of the laboratory reaction vessel arrangement.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein:

FIG. 2 schematically shows a sectional plan view of the laboratory reaction vessel of FIG. 1 with an inlet for the fluid heat transfer medium; and FIG. 2A schematically shows a further embodiment of a nozzle for adjusting an inlet flow angle of the fluid heat transfer medium.

DETAILED DESCRIPTION OF THE PREFERRED EMBODIMENTS

Figure 1:
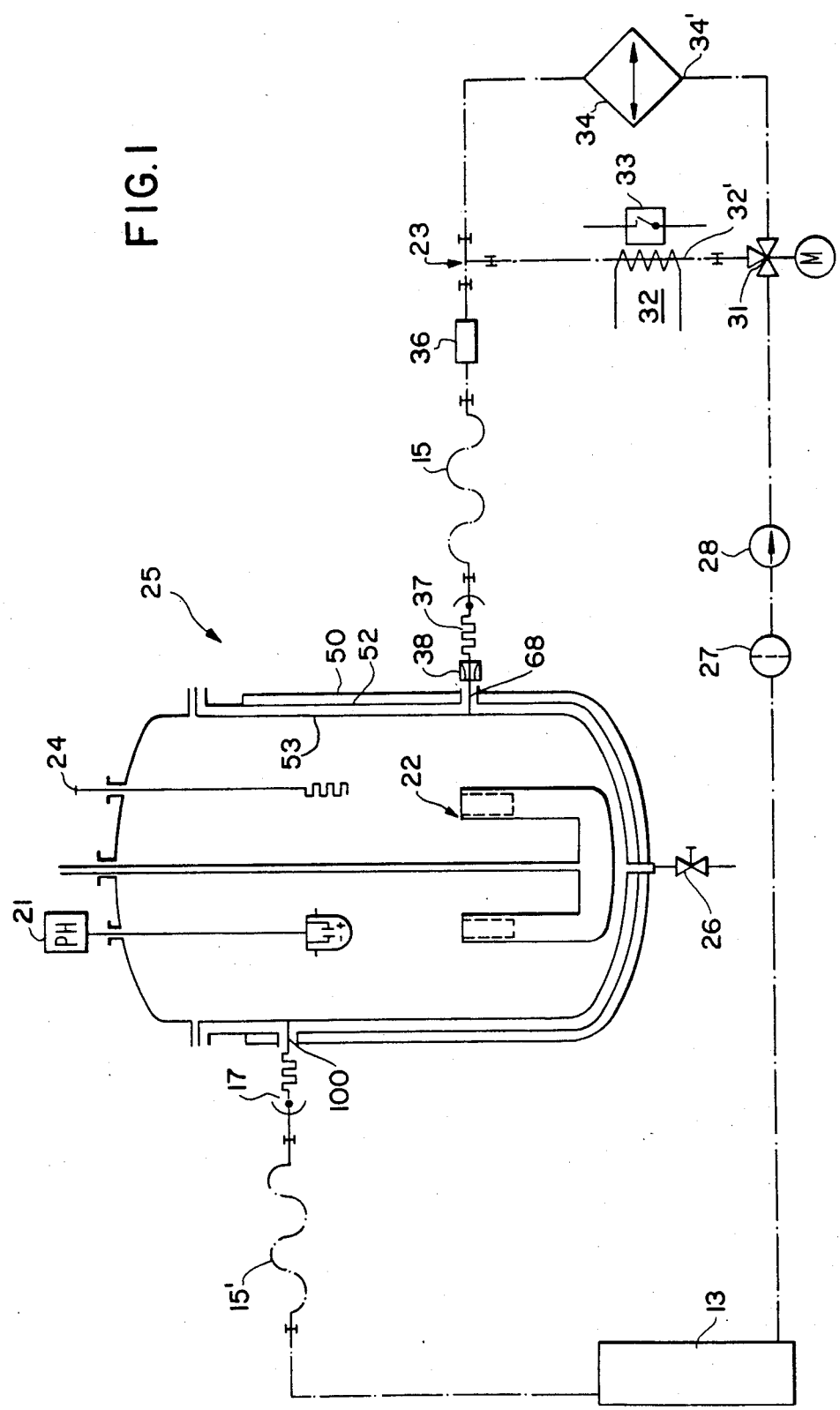
FIG. 1 schematically shows a laboratory reaction vessel with a circulation system for a fluid heat transfer medium.

Adiabatic heat exchange between materials or solid bodies always takes place spontaneously from bodies of higher temperature to bodies of lower temperature principally by three mechanisms of heat dissipation: heat convection, heat conduction and heat radiation. According to the material of the reaction vessel, e.g. metal as thermal conductor and glass as thermal insulator, the prevalent mechanisms of heat dissipation vary in importance. It can always be assumed that all three types of dissipation act simultaneously.

The laboratory reaction vessel arrangement provided with the apparatus for tempering, moderating or regulating the temperature of a reaction vessel or chemical reactor according to the present invention exploits the heat convection of a tempered fluid or fluid tempering medium or fluid heat transfer or exchange medium (which is cold or warm in relation to the content of the reaction vessel or reactor) as well as heat conduction through the walls of the reaction vessel or reactor into the contents of the reaction vessel or reactor for heat transfer or exchange. The degree of practically exploitable thermal radiation is of subordinate importance.

Describing now the drawings, it is to be understood that to simplify the showing thereof only enough of the structure of the apparatus for tempering, moderating or regulating the temperature of a laboratory reaction vessel arrangement has been illustrated therein as is needed to enable one skilled in the art to readily understand the underlying principles and concepts of this invention. Turning now specifically to FIG. 1 of the drawings, the apparatus illustrated therein by way of example and not limitation and employed to realize the method as hereinbefore described will be seen to comprise a closed circulation circuit for a fluid tempering medium or fluid heat transfer or exchange medium and a laboratory reaction vessel arrangement or chemical reactor 25. A reaction vessel 53 thereof has on its upper side various not particularly referenced apertures or openings for supplying, for instance, educts or reactants of the reaction to be performed and also has on its underside an outlet provided with a valve 26 for the reaction products.

The educts or reactants are supplied through the apertures in the cover of the reaction vessel 53 of the reactor and the reaction product is removed either by a probe or syphon or the like extending to the floor of the reaction vessel 53 or else through the opening provided with the valve 26 located in the bottom of the reaction vessel 53. In the latter case, the outlet is arranged at the lowest point of the bottom or floor of the reaction vessel 53 and is obturatable by the valve 26. Measuring instruments, such as a pH-meter 21, a temperature sensor 24 and the like extend through the not particularly referenced apertures provided in the cover and into the reaction space or chamber of the reaction vessel 53. An agitator or stirring mechanism 22 is centrally conducted through the cover and rotatably journaled therein, as can be seen from FIG. 1.

The tempering apparatus or apparatus for moderating or regulating the temperature of the laboratory reaction vessel arrangement 25 according to the invention can be controlled or regulated in relation to the values measured by one or more of these measuring instruments or sensors, but can also be controlled or regulated in relation to elements determining other process parameters. This laboratory reaction vessel arrangement or chemical reactor 25 comprises a jacketing vessel 50 in which the reaction vessel 53 is at least partially immersed. The reaction vessel 53 forms conjointly with the jacketing vessel 50 an annular or ring-shaped thermal chamber 52 for the tempering fluid or fluid heat transfer or exchange medium. The tempering fluid or fluid heat transfer or exchange medium is introduced into the thermal chamber 52 through an aperture or opening arranged laterally in the lower portion of the jacketing vessel 50 and is conducted out again through an overflow aperture or opening 100 defining an outlet or outlet port provided laterally in the upper portion of the jacketing vessel 50.

The tempering fluid or fluid heat transfer or exchange medium flows, as illustrated in FIG. 1, through a circuit in which a source 32 of thermal energy or a sink 34 for thermal energy or both are included. The source 32 has a first inlet 32' and the sink 34 a second inlet 34'. The source 32 and the sink 34 are connected in parallel and the tempering fluid or fluid heat transfer or exchange medium conducted back from the laboratory reaction vessel arrangement 25 can either be conducted through both the source 32 and the sink 34 simultaneously in partial currents or flows or else can be conducted exclusively through either the source 32 of thermal energy or the sink 34 for thermal energy.

The thermally differently loaded partial fluid currents or flows are reunited again in a T-junction 23 and homogenized. A static mixer or mixing device 36 is provided for this homogenizing process. The static mixer 36 intermixes or blends the mass flows or currents transporting the thermal energy to a high degree without failure-prone technical expenditure.

Describing the tempering or temperature regulating circuit according to FIG. 1 beginning with an expansion vessel or chamber 13, the tempering fluid or fluid heat transfer or exchange medium flows through a filter 27 into a volumetric pump 28 and is driven by this volumetric pump 28 into a controlled distributor or mixing valve 31, such as a multiple-way valve. At this location the fluid flow or current is divided into partial flows or currents according to a comparison of actual temperature with a reference or set temperature and is appropriately distributed through the source of thermal energy 32, 33 and the sink for thermal energy 34. Alternatively, the fluid flow or current can be exclusively conducted as a main flow or current through either the source of thermal energy 32, 33 alone or the sink for thermal energy 34 alone.

The source of thermal energy 32, 33 may be, for instance, a circulation heater or heat exchanger having a heating element 32 and a switch 33 controlling the heating element 32. The temperature sink or sink for thermal energy may be a cold reservoir (heat sink) realized in the form of a heat exchanger 34 connected into a refrigeration circuit.

The distributed partial currents or flows are reunited in the T-junction 23 before entering the static mixer 36 and are subsequently homogenized in the static mixer 36. This static mixer 36 permits an unproblematic homogenization of the various temperature zones in the tempering fluid or fluid heat transfer or exchange medium to a fluid flow or current of the desired temperature which is free of temperature anomalies.

In order to permit a limited mobility of the laboratory reaction vessel arrangement or chemical reactor 25 for various kinds of manipulation, both the inlet or inlet port 68 and the outlet or outlet port 100 of the fluid circuit are connected to flexible or resilient conduit members 15 and 15′, respectively. The temperature of the tempering fluid or fluid heat transfer or exchange medium flowing into the laboratory reaction vessel arrangement 25 and flowing out again after surrendering or absorbing thermal energy is, in this illustrative example, measured by thermal sensors 17 and 37 at two locations at the inlet or inlet port 68 to and the outlet or outlet port 100 from the thermal chamber 52 and the temperature difference is evaluated. It is also possible to measure the temperature exclusively at the inlet or inlet port 68 to or at the outlet or outlet port 100 from the thermal chamber 52 and to evaluate a temperature difference in relation to a reference or set temperature. The tempering fluid or fluid heat transfer or exchange medium flowing out of the thermal chamber 52 passes from the outlet port 100 through the second flexible or resilient conduit member 15′ back into the expansion chamber or vessel 13.

Entrance of the fluid heat transfer or exchange medium into the annular thermal chamber 52 is through a nozzle 38. This arrangement has the following purpose:

The homogeneous temperature field of the flowing fluid tends to form layers at boundaries of the fluid adjacent bodies of a different temperature. These layers display strong temperature gradients in a direction orthogonal to the fluid boundaries, since at initiation of a partial laminar flow the individual fluid layers have or can have an insulative effect according to the specific heat, the thermal capacity and the thermal conductivity of the fluid. With temperature profile flanks of usual steepness, the reduction of the thermal conductivity by such fluid layering is normally negligible. However, as soon as a rapid exchange of energy is required, the arisal of such fluid temperature layerings cannot be tolerated. Yet in order to achieve the necessary, relatively rapid, uniform flow through the laboratory reaction vessel arrangement 25, which requires a substantially tangential inflow of the tempering fluid or fluid heat transfer or exchange medium into the annular thermal chamber 52 which, in turn, promotes lamination of the flow, the present invention is based on the concept of providing a unidirectional turbulent flow of the tempering fluid or fluid heat transfer or exchange medium in order to efficiently extract thermal energy from the reaction product through the wall of the reaction vessel 53 or to efficiently supply thermal energy to the reaction product through the wall of the reaction vessel 53 from the fluid heat transfer or exchange medium. This unidirectional turbulent flow is obtained by injecting the tempering fluid or fluid heat transfer or exchange medium essentially tangentially into the thermal jacket or thermal chamber 52 of the laboratory reaction vessel arrangement 25 through a nozzle 60, preferably into the lower portion of the thermal jacket or thermal chamber 52.

The introduction of the fluid heat transfer or exchange medium into the thermal chamber 52 with the goal of obtaining temporally rapid temperature changes in the reaction product is a not uncritical operation. On the one hand, as great as possible a temperature difference must be achieved between the inlet 68 and the outlet 100 to permit an efficient transfer of energy, while, on the other hand, from the regulation point of view, too great a temperature difference between the inlet 68 and the outlet 100 is undesirable. Regions in the annular thermal chamber 52 in which the fluid heat transfer or exchange medium is exchanged or re-circulated more slowly than would correspond to the average flow velocity are also undesirable.

In this illustrative example, both the inlet 68 and the outlet 100 are arranged opposite one another in the upper portion of the thermal chamber 52 and of the jacketing vessel 50. Since the exchange of fluid toward the bottom or floor of the reaction vessel 53 cannot be great enough, the inlet and outlet ports 68 and 100, respectively, are preferably arranged spatially diagonally and staggered in height in relation to one another. Temperature pockets in the thermal chamber 52 also have less tendency to form when the fluid flow is directed directly at the wall of the reaction vessel 53 serving as an impact surface. In such an arrangement the heat flow or temperature rate in the fluid itself and from the fluid to the reaction products is entirely unsupervisable or unpredictable.

All of these problems can be overcome if as screw-like or as helical as possible a conduction of flow or current of a finely turbulent, stabilized, unidirectional flow is strived for. The finely turbulent unidirectional flow of the heat transfer or exchange medium largely prevents the formation of a temperature gradient in the thermal chamber 52 and the controlled rapid flow of the fluid permits a temperature difference which is optimally exploitable as a control or adjustment magnitude or value from the regulation point of view. The helical conduction of the fluid flow largely prevents macroscopic temperature inhomogeneities in the form of the previously mentioned temperature pockets in the thermal chamber 52.

This advantageous thermal energy conduction is achieved by, as already briefly indicated, injecting the fluid heat transfer or exchange medium into the thermal chamber 52 by means of a nozzle 38 (FIG. 1) or 60 (FIG. 2). By injecting a temperature-homogeneous fluid as well as by mixing at least two tempered or temperature-regulated mass flows, a rapid temperature change within relatively broad temperature boundaries is achieved. The variables necessary for conducting the thermal energy are, inter alia, the fluid flow velocity or flow rate through the nozzle, correlated with the exchange velocity of the fluid as well as the nozzle inclination in relation to the central axis of the reaction vessel 53 of the nozzle 38 or 60 directed essentially tangentially to the periphery of the reaction vessel 53 which influences the slope or pitch of the helix.

The combination of the arrangement of the source 32, 33 of thermal energy, the sink 34 for thermal energy and the mixer 36 conjointly producing the fluid temperatures with the structure or facility for generating finely turbulent unidirectional flows in the thermal chamber 52 for an efficient energy extraction or supply permits generating temperature rises and drops in the reaction vessel 53 in temporally short sequences or periods which display the required flank steepness of rapid temperature change. The distributing valve 31 can switch from one limit value of temperature dictated by the apparatus directly into another without having to generate mixed or consolute temperatures. The subsequently arranged static mixer 36 permits, on the other hand, rapid changes of the mixed or consolute temperature between the limit values without fear of the presence of thermal streaks or spots in the fluid heat transfer or exchange medium. The entire apparatus according to the invention permits highly dynamic temperature control and, with appropriate application of regulation technology, also a high precision of temperature control.

FIG. 2 shows a sectional plan view of the laboratory reactor vessel arrangement 25 in which the reaction vessel 53 for the reaction product or products is visible. The reaction vessel 53 is surrounded or at least partially surrounded by the outer hollow cylindrical double-walled jacketing vessel 50. The annular thermal chamber 52 between the reaction vessel 53 and the jacketing vessel 50 can be considered essentially as a heating or cooling jacket. An outlet port or spigot 68 is formed on the jacketing vessel 50 such that the extension of the spigot's longitudinal axis in the vicinity of the wall of the jacketing vessel 50 extends through the interior space of the reaction vessel 53. In further not particularly shown embodiments, this longitudinal axis can be parallelly translated such that it extends essentially tangentially past the reaction vessel wall or, still further translated, through the thermal chamber 52. A fluid cone or fluid jet cone with diverging finely turbulent flow portions or components forms at the exit point or mouth of the nozzle 60 during fluid injection. The turbulent flow discharged by the nozzle 60 is to be maintained as long as possible on its way through the thermal chamber 52. This can be adjusted by shifting or translating the nozzle assembly 60A along its longitudinal axis in the direction designated by the double-headed arrow x. A measure for the adjustment is, for instance, the maximization of the differential temperature between the inlet 68 and the outlet 100 at a constant flow velocity of the fluid heat transfer or exchange medium through the nozzle 60. The longitudinal axis of the nozzle assembly 60A can be arranged in relation to a hypothetical circumferential line about the laboratory reaction vessel arrangement 25 such that the fluid jet is directed slightly upwardly, according to FIG. 2 out of the plane of the drawing, i.e. toward the exit aperture or outlet 100 in order to be able to adjust the helical course or path of the fluid heat transfer or exchange medium within the thermal chamber 52 from the bottom against the force of gravity to the top. The slope or pitch angle should remain below 10°, analogous to the pitch of a fine thread.

A further embodiment for adjusting the slope or pitch angle under present discussion is schematically shown in FIG. 2A. The nozzle tip or mouth 62 shown in cross-section is provided with a nozzle outlet or orifice 62' shown exaggeratedly angled or askew in this illustrative embodiment.

A simple rotation of the nozzle assembly 60A about its principal axis, as indicated by the double-headed arrow y in FIG. 2, effects variations of the helical flow of the finely turbulent unidirectional fluid flow through the thermal chamber 52 due to the asymmetrical swivelling of this skew or angled nozzle orifice 62'.

As a rule, connection ports or spigots of reaction vessels made of glass comprise ball and socket joints as means of connection. The ball 65 of such a ball and socket joint is illustrated in FIG. 2. The nozzle assembly 60A is, in this illustrative embodiment, conducted through the inlet port or spigot 68 and fastened by not particularly shown suitable means. A temperature sensor 61 corresponding to the temperature sensor 37 of FIG. 1 can be arranged concentrically in the nozzle channel of the nozzle 60 to measure the temperature of the tempering fluid or fluid heat transfer or exchange medium at the inlet 68 to the thermal chamber 52 for temperature measurement. This measuring location is preferred when precise and rapidly stabilizing reference value temperatures are required in the laboratory reaction vessel arrangement 25, since at this location the mixed or consolute temperature of the fluid or fluid heat transfer or exchange medium composed of various partial components from the source of thermal energy or the sink for thermal energy, or both, will have already passed through any possibly disturbing or falsifying passages. In any case, the inlet temperature should be measured in the temperature-homogeneous fluid heat transfer or exchange medium following the static mixer 36 in the direction of flow.

While there are shown and described present preferred embodiments of the invention, it is to be distinctly understood that the invention is not limited thereto, but may be otherwise variously embodied and practiced within the scope of the following claims.

Accordingly, what I claim is:

1. A method of regulating the temperature of a laboratory reaction vessel arrangement having a thermal chamber surrounding the reaction vessel and through which a liquid heat exchange medium for transporting thermal energy is conducted, comprising the steps of:

providing a thermally homogeneus flow of liquid heat exchange medium at a predeterminate temperature and a predeterminate flow rate;

introducing said thermally homogeneous flow of said liquid heat exchange medium into a lower portion of the thermal chamber through at least one inlet port located diagonally oppositely below at least one associated outlet port;

said step of introducing said thermally homogeneous flow of said liquid heat exchange medium entailing directing said thermally homogeneous flow of said liquid heat exchange medium substantially tangentially at a containment wall of the laboratory reaction vessel at an upward inclination of at most 10° such that a substantially helical upward current is induced about the exterior of the laboratory reaction vessel;

said step of introducing said thermally homogeneous flow of said liquid heat exchange medium entailing employing a nozzle assembly to introduce said thermally homogeneous flow of said liquid heat exchange medium as a finely turbulent unidirectional flow such that the formation of a temperature gradient transverse to said substantially upward helical current is substantially prevented, such that a temperature-regulationally optimum temperature difference between said at least one inlet port and said at least one outlet port is permitted and such that macroscopic thermal inhomogeneities are substantially prevented;

measuring said temperature-regulationally optimum temperature difference by means of a first temperature sensor at said at least one inlet port and a second temperature sensor at said at least one outlet port; and longitudinally translatably adjusting said nozzle assembly such that said temperature-regulationally optimum temperature difference is maximized at a constant value of said predeterminate flow rate for maintaining said finely turbulent unidirectional flow for as long a path as possible along said substantially upward helical current.

2. The method as defined in claim 1, wherein:
said predeterminate temperature is greater than the temperature of a substance within said laboratory reaction vessel.

3. The method as defined in claim 1, wherein:
said predeterminate temperature is less than the temperature of a substance within said laboratory reaction vessel.

* * * * *

UNITED STATES PATENT AND TRADEMARK OFFICE
CERTIFICATE OF CORRECTION

PATENT NO. : 4,671,344

DATED : June 9, 1987

INVENTOR(S) : GEORG ZEMP

It is certified that error appears in the above-identified patent and that said Letters Patent is hereby corrected as shown below:

Column 2, line 16, after "order" please insert "to"

Column 7, line 37, at the beginning of the line, please delete "x" and insert --$\underline{x}$--

Column 7, line 61, after "arrow" please delete "y" and insert --$\underline{y}$--

Column 8, line 33, after "thermally" please delete "homogeneus" and insert --homogeneous--

Signed and Sealed this

Fifteenth Day of December, 1987

*Attest:*

DONALD J. QUIGG

*Attesting Officer*   *Commissioner of Patents and Trademarks*